March 7, 1967  S. STEVENS ETAL  3,307,930
METHOD OF AND APPARATUS FOR BENDING GLASS SHEETS
Filed Oct. 21, 1963  3 Sheets-Sheet 1
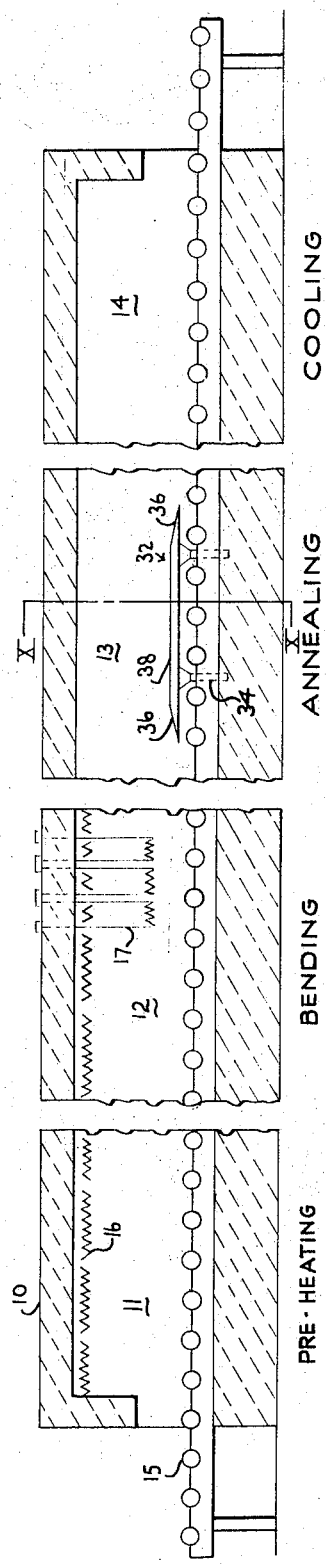
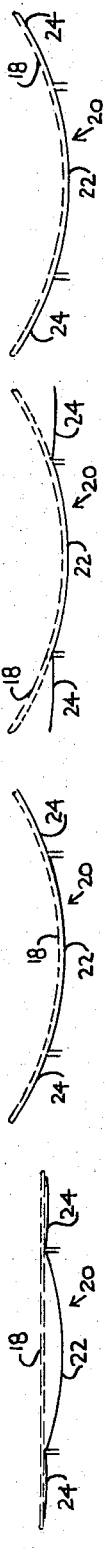
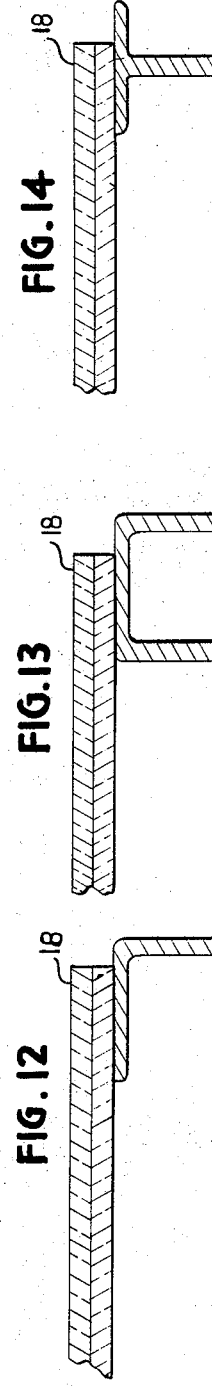
INVENTORS
STEPHEN STEVENS and
PAUL D. SHAFFER
BY
Oscar Spencer
ATTORNEY

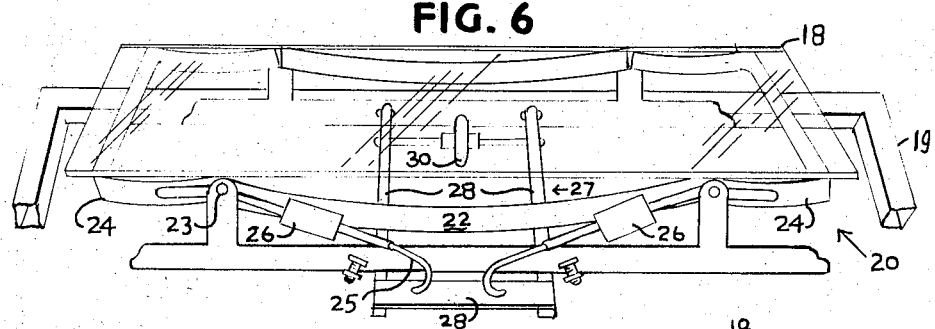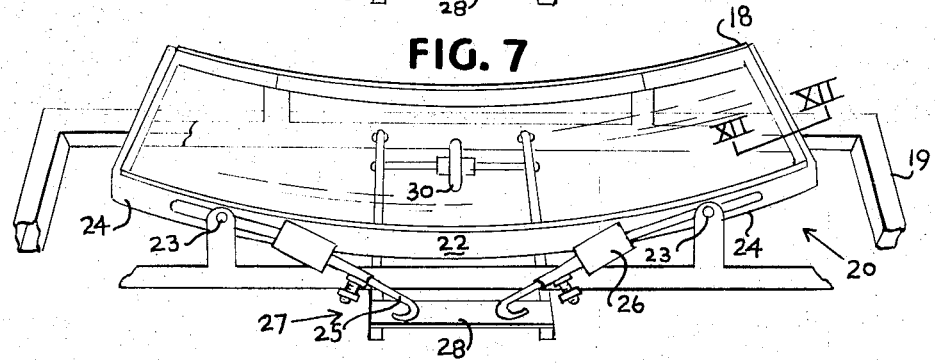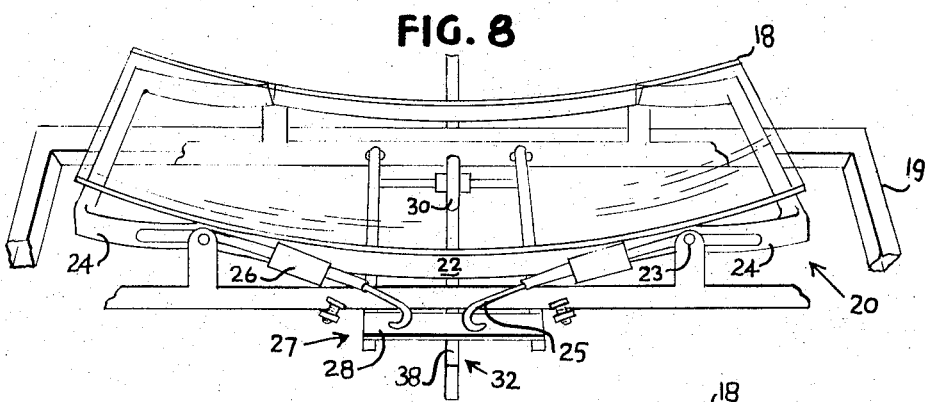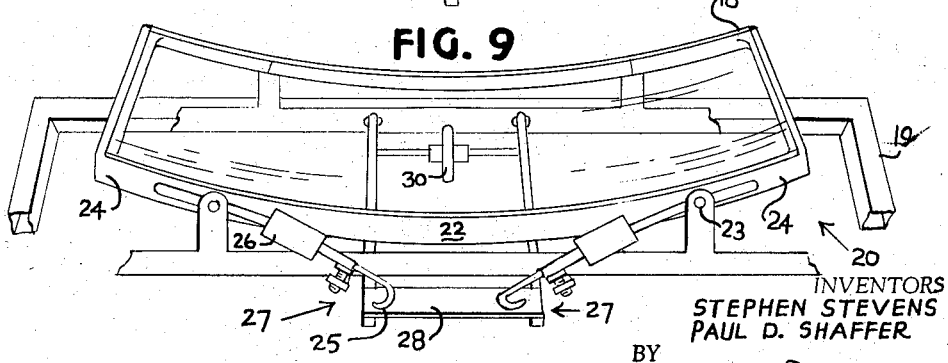

March 7, 1967 S. STEVENS ET AL 3,307,930
METHOD OF AND APPARATUS FOR BENDING GLASS SHEETS
Filed Oct. 21, 1963 3 Sheets-Sheet 3

INVENTORS
STEPHEN STEVENS and
PAUL D. SHAFFER
BY
Oscar H Spencer
ATTORNEY 3,307,930
METHOD OF AND APPARATUS FOR BENDING GLASS SHEETS
Stephen Stevens, Crystal City, Mo., and Paul D. Shaffer, New Kensington, Pa., assignors to Pittsburgh Plate Glass Company, Pittsburgh, Pa., a corporation of Pennsylvania
Filed Oct. 21, 1963, Ser. No. 317,484
10 Claims. (Cl. 65—103)

This invention relates to a method and apparatus for bending and annealing glass sheet on a sectionalized, outline mold. More specifically, the invention is directed to a method and apparatus for improving the physical characteristics along the edge portion of glass sheets produced by a continuous process in which the glass sheets are bent, by heat sagging the glass into conformity with the upper shaping surface of a sectionalized outline mold, and then annealed by controlled cooling while supported on the bending mold.

In present commercial production of laminated windshields, glass sheets are mounted in pairs on sectionalized molds, such as disclosed in U.S. Letters Patent No. 2,794,300, issued June 4, 1957, to James S. Golightly, with the end sections spread for bending. The molds are conveyed transversely through a tunnel-like bending lehr having different temperature zones. The first of these zones is a preheat zone where the temperature of the glass is raised to substantially its softening point. Beyond this zone is a bending zone where the glass is further heated with especially intense heat applied to the regions to be bent most sharply. The additional heat applied in the bending zone softens the glass, thus allowing the mold end sections to move into the closed mold position. The movement of the mold end sections into the closed mold position produces a substantially continuous upper shaping surface and helps the glass to conform to the mold rail members forming said shaping surface. The preheat zone and bending zone provide the hot atmosphere needed to conform the glass sheets to the mold shaping surface.

The bent glass sheets are then annealed by controlled cooling as they are conveyed on the bending molds through an annealing zone having successive regions of progressively lower temperature. The annealing range for commercial plate glass, such as used in windshields, is from approximately 1050 degrees Fahrenheit to 960 degrees Fahrenheit. Following annealing, the bent, annealed glass sheets are conveyed on the bending molds through a cooling zone where the temperature of the glass sheets is reduced sufficiently to permit manual unloading of the molds.

It is well known in glass technology that nonuniformly cooling a body of glass through its annealing range over a short time interval causes the glass to assume a physical condition of permanent stress in which the relatively slowly cooled portions or regions are stressed in tension and other relatively rapidly cooled regions are stressed in compression. Suitable means are known and available to the art for making an accurate determination of the tension and compression characteristics, i.e., the magnitude and type of stress or strain, within a particular body of glass.

The particular means used in conjunction with this invention for optically measuring stresses, both tensile and compressive, involves placing the sheets of bent and annealed glass between a polarized light source and a graduated quartz wedge. The quartz wedge is calibrated in millimicrons. The polarized light passes through the thickness dimension of the sheets to be measured and the quartz wedge. A trained observer viewing directly into the quartz wedge will see a distinctive band which delineates and defines the maximum deviation of polarized light caused by the particular type of stress being observed. The graduations on the quartz wedge permit a direct reading of the magnitude of the strain in millimicrons per glass thickness or the maximum deviation of a beam of polarized light from the path it would take through the thickness of the glass if the glass were unstressed.

The locality within the glass sheets which is to be measured is either selected or it is possible to locate the point of maximum stress by scanning the surface area of the glass sheets. The strain corresponding to the stress, at the selected locality, is then measured by looking through the quartz wedge directly into that locality.

The compressive stress of the peripheral margin of glass sheets bent and annealed on sectionalized molds is measured by looking at the surface of the sheets directly at their edge, i.e., the compressive stress zone. Similarly, the tensile stress of the peripheral margin of these sheets is measured from ½ to 1¼ inches inwardly from the edge of the sheets, i.e., the tensile stress zone.

The graduations on the quartz wedge give the measured strain value in units of millimicrons per glass thickness. The measured strain value, adjusted to millimicrons per inch, may be converted to pounds per square inch stress units by multiplying by the stress optical coefficient. The stress optical coefficient will vary for different glass compositions. For commercial plate glass, such as used in automobile windshields, the stress optical coefficient is 2.13 pounds per square inch for each millimicron per inch of strain.

Glass sheets and, in particular, their peripheral edges exhibit a greater ability to withstand stresses frequently encountered in handling, installation and use when stressed in compression rather than tension. Thus, for example, it has become desirable in the formation of wrap-around automobile windshields to be able to improve the inherent residual stress characteristics of the edge of the glass sheets by increasing the compressive stress at the edge, thus giving a greater resistance to breaking or chipping originating along the edge during handling and installation. At the same time, since glass is weak when stressed in tension, it is also desirable to limit the maximum tension stress inwardly of the edge of the glass sheet in order to increase the resistance to crack propagation in the event the glass surface in the tension zone is chipped or scratched during use.

According to the present invention, a plurality of glass laden, sectionalized molds are sequentially transported along the path of a continuous conveyor operating within a heated tunnel-type bending lehr. The lehr is divided in a conventional manner into a preheat and bending zone and an annealing and cooling zone. A controlled temperature atmosphere is provided in each zone.

Each of the sectionalized mold assemblies is suitably equipped with an end section opening device. In the annealing zone, there is located an actuating device which coacts with the end section opening device to move the flanking end sections of each sectionalized mold away from the glass sheet surface and retain the end sections in such position as the molds are sequentially conveyed through that portion of the annealing zone where the temperature of the glass sheet is within its annealing range and which permits the end sections to return to contact with the glass when the glass reaches a position where its temperature is below the annealing range.

The present invention modifies the practice of the prior art. In employing prior art methods and apparatus, the mold rails are continuously maintained in contact with the adjacent glass sheet surface throughout the annealing range of temperatures, where the stress pattern is permanently established in the bent glass sheets.

The present invention has found that the proximity of the metal shaping surface to the glass sheets, while the glass sheets are being conveyed through their annealing range of temperatures, causes a particularly undesirable high tension stress to be established a slight distance inwardly of the glass edge. It is reasoned that this high tension stress results from the relatively high heat capacity of the metal shaping members and their ability to re-radiate and conduct heat, absorbed in the preheating and bending zones, into the adjacent glass portions while the glass is being conveyed thereon through its annealing range. Stated differently, the presence of a heated metal mass adjacent to a body of glass during annealing by controlled cooling tends to retard the rate of cooling of the adjacent glass portion and thereby allows undesirable stress characteristics to be permanently established in the glass peripheral portion. A partial solutoin to this problem, which results in improving the stress pattern along the longitudinal side portions of the peripheral edge of bent, annealed glass sheets, is fully disclosed in application Serial No. 255,062, filed January 30, 1963, now abandoned and assigned to the assignee of the present invention.

The present invention improves the physical characteristics along the transverse side portions of the peripheral edge of bent, annealed glass sheets. These edge portions are normally supported during bending and annealing on metal rail members attached to the pivotable end sections of a sectionalized mold. The heat given up by the metal rail members tends to retard the rate of cooling of the adjacent peripheral portions of the glass sheet during annealing. When crease heaters are employed in the end section areas to produce sharply curved bends, localized portions of the glass sheet are intensely heated and thus, the presence of heated rail members which retard the rate of cooling of the glass becomes even more critical.

The problem of adjacent metal members imparting undesirable stress characteristics along transverse side portions of glass sheets during annealing is further intensified when it is found necessary to use metal ballast attached to the flanking end sections to control the optical properties in bent sheets, particularly in the sharply bent end portions of a wrap-around windshield. The use of metal ballast to control optics has been restricted in the past because the relatively high heat capacity of the metal ballast helps to produce unsatisfactory residual stress in the adjacent portions of the glass during annealing.

The problem of improving residual stress in glass sheets during annealing has also seriously limited the type of rail member formerly employed in the mold design. The heat re-radiated and conducted from a metal member into an adjacent portion of a supported glass sheet depends upon both the volume of the metal member and its geometry. Thus, the use of metal rail members having a glass bearing and forming surface of relatively large area, e.g., open or box channel sections and T shaped cross-sections, which produce bent glass sheets within closer tolerances than molds having rail members disposed edgewise or of an inverted T cross-section, was virtually prohibited in the prior art. A substantial quantum of the heat stored within the metal rail member during bending was transmitted through its relatively larger surface area and thence into the glass during annealing and resulted in an unsatisfactory stress condition in the bent, annealed glass sheets.

The present invention provides a bending mold assembly with an end section opening device which is actuated upon coming into a portion of the annealing zone where the temperature of the glass is within its annealing range and in turn opens the end sections of the bending iron or mold a sufficient distance to prevent the stored heat in any included metal ballast or glass bearing and forming members from influencing the residual stress produced in the end portions of the bent, annealed glass sheets. The end sections are returned to their original closed position when the bending mold assembly reaches a portion of the lehr where the glass temperature is below the annealing range.

An illustrative embodiment of this invention comprises a cam rail or monorail located in the annealing zone and having an upper surface portion elevated above the conveyor rolls and an inclined transition surface portion located on each of its longitudinal ends, a cam follower movably mounted on each sectionalized mold assembly, an extended portion of the cam follower, and an extension of each flanking end mold section positioned for actuation by the extended portion of the cam follower to pivot the end mold sections away from the glass sheet surface as the cam actuates the cam follower. When the cam follower moves beyond the cam, the end section extensions are disengaged from the extended portion of the cam follower to permit the end mold sections to pivot into their normally closed position supporting the bent end portions of the glass sheet.

It was noted that the residual stress characteristics along the transverse side portions of the peripheral edge of the bent, annealed sheets were improved as a result of moving the flanking end sections of the mold away from the glass sheet surface during the period that the glass cooled through the annealing range wherein permanent stresses are established in the glass. This is directly attributable to the fact that the movement of the end sections from the glass sheet surface during the critical portion of the annealing cycle removed a large body of heat which would tend to develop regions of tension stress inwardly from the vicinity of the glass edge.

Another advantage which resulted from employing the disclosed invention was that it made possible the use of heavy metal ballast to improve the optical properties in wrap-around portions of a bent sheet, such as a windshield. It also removed the restriction on the type of structure employed for the upper shaping rail member of the bending mold and permitted the use of wider shaping surfaces. These advantages accrued as a result of removinng these members from adjacent the glass sheet surface during the time the glass sheet cooled through the annealing range of temperatures, where the glass becomes permanently stressed.

Finally, the practice of the present invention made it possible to reduce the magnitude of the residual tension stress in the end sections of bent windshields and thereby provided a stronger and more stable windshield.

In the drawings form part of this specification:

FIG. 1 is a schematic representation of a longitudinal section through a tunnel-type bending lehr for practicing this invention.

FIGS. 2 to 5 represent schematically the relationship of the mold sections to the glass as they would appear in a transverse section taken through the lehr in the preheating, bending, annealing and cooling zones, respectively.

FIGS. 6 to 9 are perspectives showing, schematically, the details of the principal elements of this invention, including the sectionalized mold, the cam follower and the cam monorail, and illustrates their relationship to the glass and to each other in the preheating, bending, annealing and cooling zones, respectively.

FIGS. 12-14 show in cross-section an open channel, a box channel and a T shaped glass bearing and forming member, respectively, as each member would appear in a view taken along the line XII—XII of FIG. 7.

Figure 10:
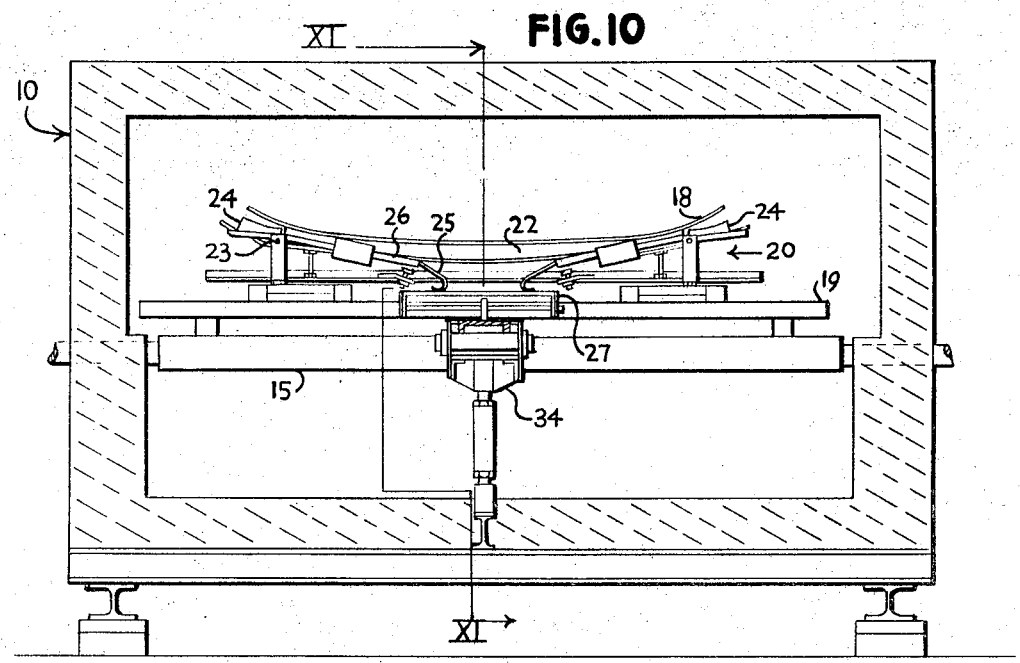
FIG. 10 is a transverse cross-section through the tunnel-type bending lehr at the annealing zone showing the details of the preferred apparatus for opening the mold end sections and the relative position of the bent glass and the sectionalized bending mold during the interval when the end sections are held open, and is generally indicated by the line X—X of FIG. 1.

Referring now in detail to the drawings and in particular FIG. 1 thereof, the tunnel-type bending lehr 10 is an elongated structure constructed of refractory materials. The lehr 10 is divided by a suitable partition (not shown), formed by suspending strips of flexible heat-resistant material such as fiberglass or asbestos, into a preheat zone 11, a bending zone 12, an annealing zone 13 and a cooling zone 14. The preheat, bending, annealing and cooling zones may, if desired, be sub-divided into further distinct zones (not shown) for the purpose of isolating the ambient conditions within said sub-divided zones.

The preheat and bending zones are suitably provided with a plurality of primary heating devices 16 which may be of any well-known type construction. Preferably, the primary heating devices 16 are of the electric resistance type, with groups of said devices being disposed along the length of the preheat and bending zones. Each heating device is independently controllable by known electrical control means (not shown), as to the amount of heat generated. Additionally, auxiliary heaters 17, of a known construction, such as those disclosed in United States Patent No. 2,794,300, issued on June 4, 1957 to James S. Golightly, may be provided in the bending zone 12 to provide especially intense localized heat as required. These auxiliary heaters are generally referred to in the bending art as crease heaters.

FIGS. 2 to 5 show schematically the relationship of the bending mold sections to one or more glass sheets 18 as they would appear in a transverse section taken through the lehr 10 in the preheating, bending, annealing and cooling zones, respectively. As best shown in FIGS. 6 to 10, the individual molds are of the sectionalized, outline type construction, fully discolsed in the Golightly patent, supra, and in general comprises a center section 22 to which flanking end sections 24 are pivotally attached through hinges 23. Each end section is counterweighted by a weighted lever arm 26 having an extension known as a pigtail 25 attached to its longitudinal inner end.

In FIGS. 6 to 10, the relationship between the mold sections, the cam follower, the cam monorail and the glass during preheating, bending, annealing and cooling, respectively, is shown schematically in greater detail. In particular, there is shown the preferred embodiment of the cam follower or end section opening means and the cam monorail or actuating means for the cam follower. The cam follower 27, as shown in FIGS. 6 to 9, consists essentially of a U-shaped member 28 rotatably attached to the mold supporting structure or carriage 19 by the legs or flanges forming the open end of the U. The web or connecting portion of the U-shaped member, located opposite to the axis of rotational attachment, forms an abutment member for cooperative engagement with the pigtails 25. A wheel member 30 is rotatably mounted by means of an axle between the legs of the U-shaped member. In FIG. 8 there is shown a portion of a cam monorail 32 which coacts with the wheel member 30 of the cam follower 27 to pivot the cam follower, thus lifting the web of the U-shaped member 28, which in turn abuts against the pigtails 25 to lift the latter. As the pigtails 25 are lifted, the lever arms 26 are pivoted upward about hinges 23, thus lowering the end sections of the bending mold out of contact with a bent glass sheet supported thereon.

Figure 11:
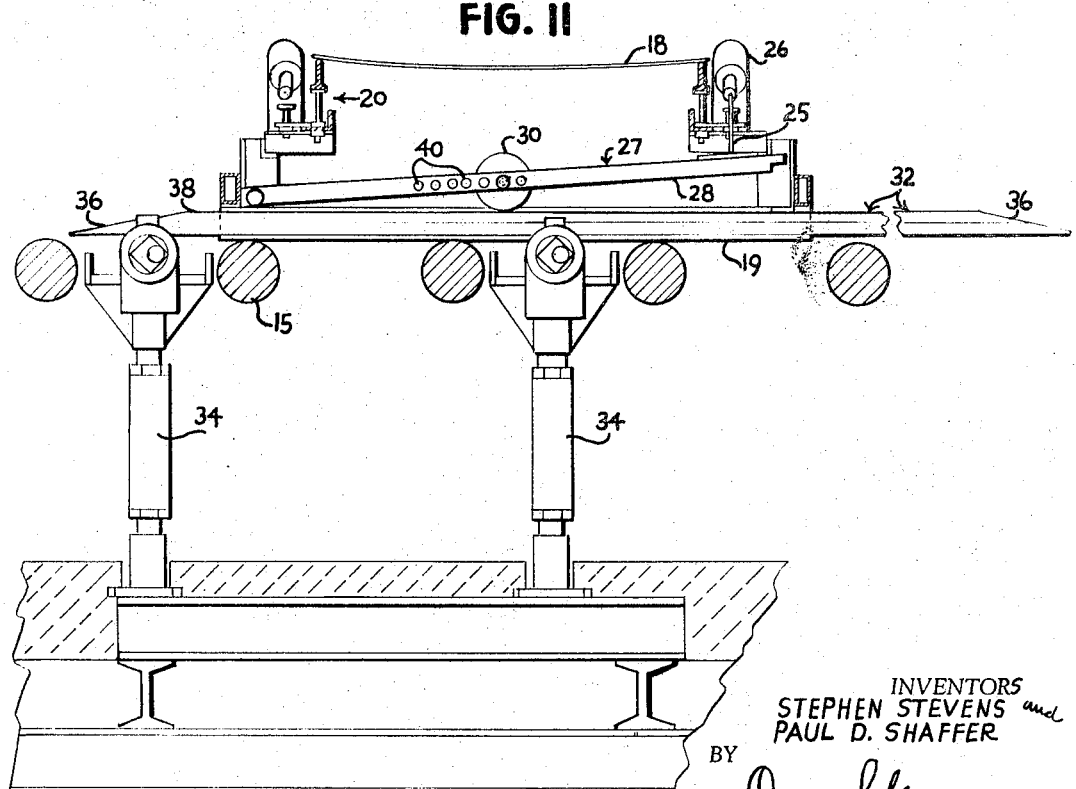
FIG. 11 is a longitudinal cross-section, along the line XI—XI of FIG. 10, through the tunnel-type bending lehr at the annealing zone showing details of the apparatus for opening the mold end sections.

FIGS. 10 and 11 show in cross-section the details of the apparatus of the present invention as it would appear in the annealing zone. Of particular note in FIGS. 10 and 11 are the showing of the relative position of the monorail 32 with respect to the conveyor rolls 15. The monorail 32 is supported by adjustable jack stands 34 above the upper level of the conveyor rolls 15 and in alignment with the path of movement of the wheel members 30 of the cam follower 27. As best shown in FIG. 11, the monorail 32 has an inclined surface portion 36 formed on each of its longitudinal ends to accommodate the transition of the cam follower from its normal horizontal position to its operating position holding the flanking end sections open and the wheel member 30 riding along the major portion of the cam surface 38 of the monorail 32. It is also apparent in FIG. 11 that the axle supporting the wheel members 30 can be adjustably positioned along the length of the legs of the U-shaped member 28 and a plurality of aligned bores 40 are provided in each leg for this purpose. This arrangement permits varying the extent of travel of the U-shaped member and thus the extent of opening of the end sections.

FIGS. 12–14 show the glass sheet 18 supported on rail members of different cross-sections which, as a result of this invention, may be used to provide wider glass bearing and forming surface for the end sections than the previously used edgewise disposed or inverted T cross-section shaping rails. FIG. 12 shows a section through an open channel member, FIG. 13 shows a section through a box channel member and FIG. 14 shows a section through a T shaped member. Prior to this invention, the high heat capacity and relatively large bearing surface area of the illustrated members precluded their use because they caused tension stress in the supported edges of the glass sheets.

The mode of operation of the above apparatus producing improved stress characteristics in the end marginal edges of bent glass sheets will now be described with reference to the drawings, followed by the details of an actual embodiment of the process.

In the preheating zone (FIGS. 2 and 6) the glass 18 is flat and rigid and the flanking end sections 24 of the bending mold 20 are held by the glass in their spread or open position. In the bending zone (FIGS. 3 and 7) the glass 18 softens and as the flanking end sections 24 rotate into a closed position, the glass 18 heat sags and is mechanically bent into conformity with the upper shaping surface of the bending mold 20. In the annealing zone (FIGS. 4 and 8) the flanking end sections 24 are mechanically rotated, by means of the cam and cam follower, away from the surface of the glass 18, thus leaving the ends of the glass unsupported. The temperature of the glass at this point is sufficiently low as to preclude the unsupported glass from distorting by its own weight. In the cooling zone (FIGS. 5 and 9) the flanking end sections 24 are again returned to their closed position in contact with the surface of the glass 18.

Flat glass sheets having a total nominal thickness of about ¼ inch and about 30 inches wide by 72 inches long were mounted in pairs on stainless steel sectionalized molds weighing about 80 pounds and having the flanking end sections spread for bending. Each mold was provided with a flanking end section opening device. The opening device weighed about 10 pounds. In its normal or non-operative position, the opening device was supported on the mold carriage below the center mold section and in a horizontal plane sufficiently below the mold shaping surface to minimize the effect of its thermal capacity on the heat treatment of the supported glass sheet. The opening device was rotatably attached to the mold carriage at one end and freely supported on the mold carriage on the other end. When the mold carriage was resting on the lehr conveyor rolls, the opening device was completely free of interference with the rolls.

The glass laden molds were introduced sequentially into the preheating zone of a heated lehr. Successive molds were carried upon a lehr conveyor through the preheating zone, where the glass temperature was raised to just below its bending temperature.

The molds were then conveyed sequentially through the bending zone, where the glass was heat softened and conformed to the shape of the outline rail of the sectionalized bending molds. Conformity with the bending mold was accomplished as a combined result of the glass sagging under its own unsupported weight and mechanical force being applied to ends of the glass by inward rotational movement of the counterweighted flanking end sections.

The molds were then introduced sequentially into the annealing zone. A cam monorail was located to extend through the annealing range of temperatures of the glass and in this embodiment extended 25 feet from a starting position 5 feet from the end of the bending zone. The monorail was constructed and arranged to be adjustable for lengthwise and vertical positioning. Lengthwise adjustment was possible within a range of 2 feet on either side of the aforementioned starting point. As each mold passed over the starting point of the monorail, a wheel member on the end section opening device came into contact with an upwardly inclined surface formed on the starting end of the monorail. The wheel member was elevated as it passed along the inclined surface portion, thus causing the end section opening device to rotate about its pivotally attached end. An abutment member forming a part of the opening device and located near its freely supported end was thus elevated along a slightly arcuate path. The abutment member contacted the pigtail extensions attached to the counterweights, which in turn were fixed to the hinged end sections. As the abutment member continued along its arcuate path, it caused the counterweights and the hinged end sections to rotate into an open or spread position out of contact with the glass surface. At this point in the annealing zone, the glass temperature had decreased to about 1100 degrees Fahrenheit. This was sufficiently cool to permit its end portions to remain unsupported without fear of the unsupported glass bending of its own weight, yet sufficiently hot to insure that the end mold sections were spaced from the glass sheet portions as the glass cooled through its annealing range.

The opening device thereafter maintained the flanking end sections in an open position as it passed along the major portion of the monorail cam surface. The major portion of the monorail cam surface was located in a horizontal plane slightly above and parallel to the top level of the conveyor rolls. During this period of travel, the glass cooled through the annealing range, thus becoming permanently stressed. At the end of the monorail nearest the cooling zone, there was provided a downwardly inclined surface portion which allowed the end section opening device to resume its normal horizontal position and the flanking end sections to return to their closed position in contact with the glass surface. At this point, the glass temperature was about 900 degrees Fahrenheit, or sufficiently below the annealing range to avoid any premature contact of the glass by the end mold sections at a temperature within the annealing range.

On leaving the annealing zone, the molds were conveyed through the cooling zone, where the temperature of the glass was reduced sufficiently to permit manual unloading of the molds.

The following data is representative of the improved stress characteristics obtained by the practice of this invention on windshields bent and annealed during an actual production run.

EFFECT OF END SECTION OPENING DEVICE ON VARIOUS WINDSHIELDS

| Windshield Pattern | Driver Side | | | Passenger Side | | |
|---|---|---|---|---|---|---|
| | Edge Compression | Maximum Tension | Percent Reduction of Tension Stress | Edge Compression | Maximum Tension | Percent Reduction of Tension Stress |
| #1 | | | | | | |
| Ends Closed | 471 | 117 | | 458 | 115 | |
| Ends Opened | 420 | 101 | 15.8 | 463 | 107 | 7.5 |
| #2 | | | | | | |
| Ends Closed | 250 | 60 | | 350 | 73 | |
| Ends Opened | 227 | 53 | 13.2 | 296 | 64 | 14.1 |
| #3 | | | | | | |
| Ends Closed | 506 | 102 | | 474 | 91 | |
| Ends Opened | 452 | 74 | 22.5 | 449 | 72 | 19.7 |

The data was taken by use of a polarized light source and quartz wedge as described in detail above. The measurements were made by the observer assuming the position of one sitting within an automobile of viewing the windshield. The Driver Side readings represent the highest strain reading on the vertical side edge of the windsheld nearest the driver. The Passenger Side readings represent the highest strain reading on the vertical edge of the windshield nearest the front seat passenger. The designation "Ends Closed" refers to operations where the end sections of a sectionalized mold remained in contact with the lower glass surface throughout the annealing range of temperature. The designation "Ends Opened" refers to operations employing the same molds provided with means for moving the end sections of the sectionalized mold away from contact with the lower glass surface throughout the annealing range of temperatures.

It will be observed that the above data provides a comparison of the Maximum Tension readings, in the column "Percent Reduction of Tenson Stress." Manifestly, by virtue of this novel invention, the maximum tension stress inwardly of the side edges of the windshield (i.e., transverse edges as viewed while being conveyed through the bending lehr) is substantially reduced. It will be noted that while generally a decrease in edge compressive stress accompanies the decrease in tensile stress, the edge compressive stress has nevertheless been effectively maintained within a permissible range. It is normally considered desirable in the production of bent windshields to have the marginal edge of the windshield stressed in compression and a minimum tension stress corresponding to a strain of less than 100 millimicrons per glass thickness in the portion of the windshield adjacent the marginal edge. This marginal stress configuration produces a strong edge that resists chipping or breaking during handling, installation and use.

Although the present invention has been described with respect to specific details of certain embodiments thereof, it is not intended that such details serve as a limitation upon the scope of the invention except insofar as set forth in the accompanying claims.

We claim:
1. In a method of bending and annealing a glass sheet while the glass sheet is supported and conveyed through a controlled temperature atmosphere, having successive zones providing a bending and annealing range of temperatures, the steps of
supporting the glass sheet along peripheral portions thereof throughout the bending range of temperature and while cooling the glass sheet to substantially the top of its annealing range of temperature,
removing a portion only of the glass sheet support from contact with the glass sheet surface until the thus unsupported portion of the glass sheet surface is cooled to the bottom of its annealing range of temperatures, and
thereafter returning the removed portion of the glass sheet support into supporting contact with the glass sheet surface while maintaining the glass sheet temperature below its annealing range.

2. In a method of bending an annealing a glass sheet while supported in bending relation to a sectionalized shaping mold, having an upwardly directed shaping surface conforming to the shape desired for the glass sheet after bending, wherein the supported glass sheet is heat softened and bent into conformity with said upwardly directed shaping surface, and thereafter the bent glass sheet is cooled through its annealing range while supported on said shaping mold, said shaping mold having sufficient thermal capacity to induce a permanent stress pattern in a glass sheet maintained in contact therewith while cooled through its annealing range, the improvement comprising moving a portion only of said shaping surface away from contact with the bent glass sheet before the glass sheet cools to the top of its annealing range and while the thus unsupported bent glass sheet portion is sufficiently rigid to maintain its shape without a rigid support, and thereafter maintaining said portion of said shaping surface in spaced relation to said unsupported glass sheet portion, at least until the unsupported glass sheet portion is cooled to the bottom of its annealing range, whereby the rate of cooling of the unsupported portion of the bent glass sheet is not retarded by the heat capacity of said shaping surface portion to the extent that would take place if said shaping surface portion were not removed therefrom, and thereafter returning the removed portion of said shaping surface into supporting contact with the glass sheet surface while maintaining the glass sheet temperature below its annealing range.

3. In glass sheet bending apparatus comprising at least one mold assembly, including a mold carriage and a glass laden mold of sectionalized construction, said mold having a center section and flanking end sections pivotally interconnected thereto, a heated furnace having a bending zone and an annealing zone, said annealing zone including a portion therein maintained at a temperature range substantially equal to the glass annealing range, and a continuous conveyor supporting said mold assembly and extending through said furnace, the improvement comprising actuating means located within said furnace and end section opening means on said mold assembly arranged to coact with said actuating means and move the flanking end sections away from the glass sheet surface through said portion of the annealing zone where the temperature of the glass sheet is within its annealing range, whereby an improved stress pattern is imparted to the unsupported side portions of the peripheral edge of the bent, annealed glass sheet.

4. The apparatus of claim 3 wherein said actuating means is a cam and said end section opening means is a cam follower positioned for actuation by said cam when said mold assembly is conveyed past said cam.

5. The apparatus of claim 4 wherein said cam is an elongated rail member extending through said portion of the annealing zone maintained at a temperature range substantially equal to the glass annealing range, and said elongated rail member is longitudinally and vertically adjustable.

6. The apparatus of claim 4 wherein said cam follower is mounted on said mold carriage and is constructed and arranged to be elevated through a slightly arcuate path upon coming into contact with said cam, and has an abutment portion thereon which contacts an integral part of said flanking end sections to move them away from the glass sheet surface.

7. In a method of producing non-uniformly bent and annealed glass sheet while supported on a sectionalized, outline shaping mold having a center mold section and pivotally connected end mold sections providing a surface which conforms in contour to the final desired shape of the peripheral edge of the glass sheet, and having sufficient heat capacity to retard the rate of temperature change of the glass sheet portion in contact therewith in response to a change in temperature in an ambient environment, and wherein the supported glass sheet is heat softened and bent to substantial conformity with said surface and intense localized heat is contemporaneously applied to selected portions of the glass sheet to produce sharply bent portions therein, and the glass sheet is thereafter cooled through its annealing range while supported on the shaping mold, the improvement comprising moving the flanking end sections away from said selected bent glass sheet portions during its cooling and before the glass sheet portions reach the top of the annealing range of the glass, and maintaining the end sections in spaced relation to the glass sheet portions at least until the glass sheet portions are cooled to the bottom of said annealing range but for a period insufficient to cause the glass sheet portion to become distorted, whereby the rate of cooling of the unsupported side portions of the peripheral edge of the bent glass sheet is not retarded by the heat capacity of the end mold sections to the extent that would take place if the end mold sections were not removed therefrom, and thereafter returning the flanking end sections into supporting contact with the glass sheet surface while maintaining the glass sheet temperature below its annealing range.

8. In glass sheet bending apparatus comprising at least one mold assembly, including a mold carriage and a glass laden mold of outline construction having a center section and flanking end sections pivotally interconnected thereto, a heated furnace having a bending zone and an annealing zone, said bending zone cotaining primary heaters to provide an ambient hot atmosphere and auxiliary heaters to provide intense localized heat in selected portions of the glass sheet, said annealing zone having a portion therein where said glass sheet is cooled through its annealing range, and a continuous conveyor extending through said furnace for supporting said mold assembly therethrough, the improvement comprising actuating means mounted within the annealing zone of said furnace and flanking end section opening means on the mold assembly positioned for actuation by said actuating means when said mold assembly is conveyed past said actuating means to move the flanking end sections away from said selected portions of the glass sheet through said portion of the annealing zone where the temperature of the glass sheet is within its annealing range, whereby an improved stress pattern is imparted to the unsupported side portions of the peripheral edge of bent, annealed glass sheet.

9. Glass sheet bending apparatus comprising at least one mold assembly for supporting a glass sheet for bending, wherein said mold assembly includes a mold carriage having a sectionalized outline mold mounted thereon, and wherein said mold has a fixed center section, flanking end sections and pivots to pivotally interconnect said flanking end sections to said center section, said sections having upper shaping surfaces formed thereon, and wherein said flanking end sections have pairs of counter-weighted lever arms atttached thereto to rotate the flanking end sections about said pivots between an open mold position for supporting an unbent glass sheet for bending and a closed mold position wherein the upper shaping surfaces of said flanking end sections form substantially continuations of the upper shaping surface of said fixed center section, and wherein said counterweighted lever arms at one lateral side of said mold have pigtail extensions attached thereto at their longitudinal inner ends, said extensions extending longitudinally inward thereof, an end section opening device including a U-shaped member and a wheel member, said U-shaped member having a pair of parallel flanges, a web connecting said pair of flanges on the side opposite the open end of the U-shaped member, and wherein said flanges are rotatably attached to one side of said mold carriage by their ends spaced from said web, said flanges extending transversely of said fixed center section, said web being located subjacent said pigtail extensions for movement in a path intersecting the position occupied by said pigtail extensions in the closed mold position upon rotation of said U-shaped member, and an axle extending between the flanges of the U-shaped member for rotatably mounting said wheel member thereon, a bending furnace for receiving said mold assembly and having successive heating and cooling zones wherein said heating zone has elevated temperatures sufficient to heat the glass sheet to bending temperature and said cooling zone has progressively cooler temperatures ranging from above to below the glass sheet annealing range, a cam monorail in said bending furnace in the path of movement of said wheel member on said end section opening device and extending longitudinally through said furnace at least through said annealing range of temperatures, said cam monorail being vertically and longitudinally adjustable, and a continuous conveyor extending through said bending furnace for supporting said mold assembly thereon.

10. Glass sheet bending apparatus comprising at least one mold assembly for supporting a glass sheet for bending, wherein said mold assembly includes a mold carriage having a sectionalized outline mold mounted thereon, and wherein said mold has a fixed center section, flanking end sections and pivots to pivotally interconnect said flanking end sections to said center section, said sections having upper shaping surfaces formed thereon, and wherein said flanking end sections have pairs of counterweighted lever arms attached thereto to rotate the flanking end sections about said pivots between an open mold position for supporting an unbent glass sheet for bending and a closed mold position wherein the upper shaping surfaces of said flanking end sections form substantially continuations of the upper shaping surface of said fixed center section, and wherein said counterweighted lever arms at one lateral side of the mold have pigtail extensions attached thereto at their longitudinal inner ends, said extensions extending longitudinally inward thereof, an end section opening device including a U-shaped member and a wheel member, said U-shaped member having a pair of flanges, a web connecting said pair of flanges on the side opposite the open end of the U-shaped member, and wherein said flanges are rotatably attached to one side of said mold carriage by their ends spaced from said web, said flanges extending transversely of said fixed center section, said web being located subjacent said pigtail extensions for movement in a path intersecting the position occupied by said pigtail extensions in the closed mold position upon rotation of said U-shaped member, and an axle extending between the flanges of the U-shaped member for rotatably mounting said wheel member thereon, a bending furnace, for receiving said mold assembly and having a bending zone and an annealing zone, said bending zone containing primary heaters to provide a ambient hot atmosphere sufficient to heat the glass sheet to bending temperature and auxiliary heaters positioned above the path of movement of said mold assembly as it is conveyed through the bending furnace and aligned with selected end portions of the glass sheet supported thereon to provide intense localized heat in said selected portions, said annealing zone having a portion therein where said glass sheet is progressively cooled from above to below the glass sheet annealing range, a cam monorail in said bending furnace in the path of movement of said wheel member on said end section opening device and extending longitudinally through said furnace at least through said annealing range of temperatures, said cam monorail being vertically and longitudinally adjustable, and a continuous conveyor extending through said bending furnace for supporting said mold assembly thereon.

References Cited by the Examiner
UNITED STATES PATENTS

| | | | |
|---|---|---|---|
| 2,680,936 | 6/1954 | Grotefeld | 65—104 |
| 3,253,899 | 5/1966 | McMaster | 65—289 |

DONALL H. SYLVESTER, *Primary Examiner.*

A. D. KELLOGG, *Assistant Examiner.*